United States Patent
Mori et al.

(10) Patent No.: US 7,899,971 B2
(45) Date of Patent: Mar. 1, 2011

(54) MAINFRAME STORAGE CONTROLLER AND MAINFRAME VOLUME VIRTUALIZATION METHOD

(75) Inventors: Akihiro Mori, Odawara (JP); Shinichi Hiramatsu, Odawara (JP)

(73) Assignee: Hitachi, Ltd., Tokyo (JP)

( * ) Notice: Subject to any disclaimer, the term of this patent is extended or adjusted under 35 U.S.C. 154(b) by 577 days.

(21) Appl. No.: 12/042,698

(22) Filed: Mar. 5, 2008

(65) Prior Publication Data

US 2009/0187730 A1 Jul. 23, 2009

(30) Foreign Application Priority Data

Jan. 22, 2008 (JP) ............................. 2008-011104

(51) Int. Cl.
*G06F 12/00* (2006.01)
*G06F 12/10* (2006.01)

(52) U.S. Cl. ............................ 711/4; 711/111; 711/202

(58) Field of Classification Search ...................... 711/4, 711/111, 202
See application file for complete search history.

(56) References Cited

U.S. PATENT DOCUMENTS

2005/0033914 A1   2/2005   Matsunami et al.

FOREIGN PATENT DOCUMENTS

JP   2000-242434   9/2000

*Primary Examiner*—Jack A Lane
(74) *Attorney, Agent, or Firm*—Brundidge & Stanger, P.C.

(57) ABSTRACT

A storage controller of the present invention is capable of providing a plurality of external volumes to a mainframe as a single virtual volume without lowering write performance. A virtual volume inside a main storage apparatus is associated with a plurality of external volumes inside an external storage apparatus. When the mainframe formats the virtual volume, a control information creation unit of the main storage apparatus creates and stores control information related to the virtual volume. Consequently, it is possible to enhance processing performance when the write size specified by the mainframe coincides with the data size set in the write destination, that is, during a so-called isometric write.

9 Claims, 13 Drawing Sheets

T10

CONTROL INFORMATION FORMAT (a)

(b)

(c)

(d)

(e)

(f)

- 10: COINCIDES WITH DL1
- 01: COINCIDES WITH DL2
- 00: NO MATCH
- 1: NONSTANDARD RECORD
- 0: STANDARD RECORD

| EXTERNAL CONNECTION MANAGEMENT TABLE | | | | |
|---|---|---|---|---|
| C21 | C22 | C23 | C24 | C25 |
| VIRTUAL VOLUME # | PORT # | EXTERNAL STORAGE APPARATUS # | PORT # | EXTERNAL VOLUME # |
| #0 | #11 | #20 | #21 | #1 |
| | #12 | #20 | #22 | #2 |
| | #13 | #20 | #23 | #3 |

FIG. 8

CYLINDER NUMBER CORRECTION TABLE — T30

| EXTERNAL VOLUME # (C31) | VIRTUAL VOLUME AREA (CYLINDER NUMBER) (C32) | CYLINDER NUMBER CORRECTION VALUE (C33) | | |
|---|---|---|---|---|
| | | SEEK PROCESS (C331) | WRITE PROCESS (C332) | READ PROCESS (C333) |
| EXTERNAL VOLUME #1 | 0 - 3338 | 0 | 0 | 0 |
| EXTERNAL VOLUME #2 | 3339 - 6677 | -3339 | -3339 | +3339 |
| EXTERNAL VOLUME #3 | 6677 - 10016 | -6678 | -6678 | +6678 |

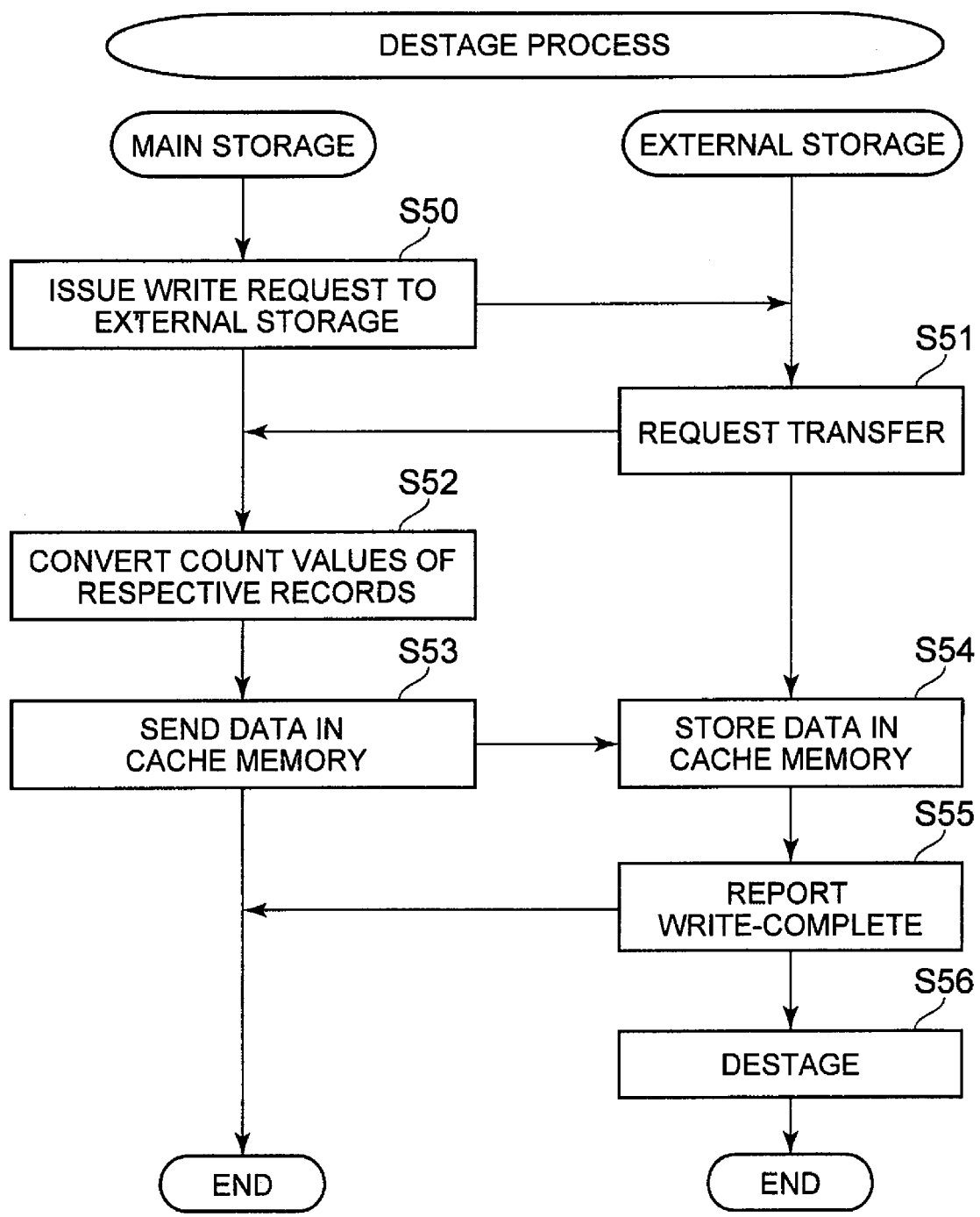

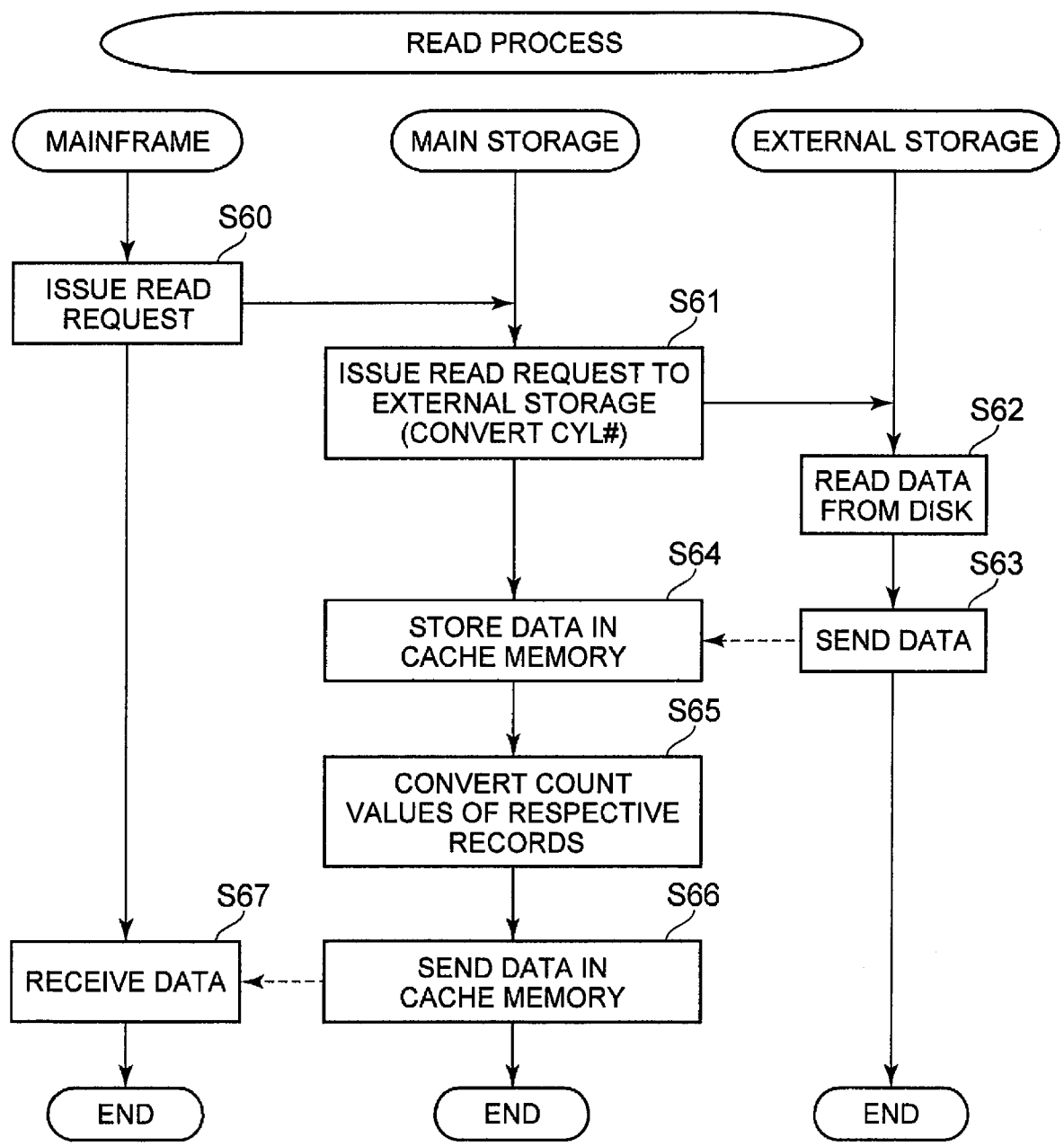

MAINFRAME STORAGE CONTROLLER AND MAINFRAME VOLUME VIRTUALIZATION METHOD

CROSS-REFERENCE TO PRIOR APPLICATIONS

This application relates to and claims priority from Japanese Patent Application number 2008-11104, filed on Jan. 22, 2008, the entire disclosure of which is incorporated herein by reference.

BACKGROUND OF THE INVENTION

1. Field of the Invention

The present invention relates to a mainframe storage controller and a mainframe volume virtualization method.

2. Description of the Related Art

For example, financial institutions and others use mainframes to make use of large amounts of data in their business operations. Storage controllers, which provide volumes for use by mainframes, are connected to the mainframes. The amount of data handled by mainframes is increasing every day. Accordingly, disk drives are being added to the storage controllers, and/or new storage controllers are being introduced into systems in response to the increasing data quantities.

However, there are limits as to how many disk drives can be added. When a plurality of storage controllers is introduced into a system, maintaining and managing this system is troublesome, and the storage areas of the respective storage controllers cannot be used effectively.

Now then, although not mainframe storage controller technology, technology for combining and virtualizing a plurality of volumes into one virtual volume is known in a so-called open storage controller (JP-A-2000-242434).

In the above-mentioned prior art, a plurality of real volumes of an old-fashioned storage controller can be combined into a single virtual volume and provided to a server. However, the above-mentioned prior art is for an open storage system, and cannot be used as-is in a system comprising a mainframe. This is because the method for handling data differs between a mainframe and an open system.

Furthermore, simply virtualizing a plurality of real volumes into a single virtual volume actually raises the risk of lower access performance. This is because, when old data is needed to process a write command, the old data must be read out from the respective real volumes for each write command issued by the mainframe.

SUMMARY OF THE INVENTION

Accordingly, an object of the present invention is to provide a mainframe storage controller and a mainframe volume virtualization method that enable a plurality of real volumes to be virtualized and provided to a mainframe as a single virtual volume. Another object of the present invention is to provide a mainframe storage controller and a mainframe volume virtualization method that enable a plurality of real volumes to be provided to the mainframe as a single virtual volume without lowering access performance. Yet other objects of the present invention should become clear from the descriptions of the embodiments, which will be explained hereinbelow.

A mainframe storage controller, which accords to a first aspect of the present invention for solving the above-mentioned problems, is a mainframe storage controller connected to a mainframe and another storage controller, the other storage controller comprises a plurality of mainframe real volumes, and the mainframe storage controller comprises a virtual volume associated with the respective real volumes; a converter for converting a command and data received from the mainframe to a command and data to be sent to the other storage controller, and converting data received from the other storage controller to data to be sent to the mainframe; a control information creation unit for creating control information related to the format of the virtual volume, and managing this control information by associating same with the virtual volume; and a command processor, which uses the converter and control information creation unit to process a command issued from the mainframe, and to notify the mainframe of the result of this processing.

In a second aspect according to the first aspect, the converter comprises a command converter for converting a parameter in the command; and a data converter for converting a count value in the data.

In a third aspect according to the first aspect, the converter comprises: a command converter, which is for converting a parameter in the command, and which, upon receiving the command for the virtual volume from the mainframe, converts a first cylinder number in this command to a second cylinder number of the corresponding real volume from among the respective real volumes; and a data converter, which is for respectively converting the count value of the each record of the data received from either the mainframe or the other storage controller, and which, upon receiving the data from the mainframe, respectively converts the count value of the each record in this data to the second cylinder number, and upon receiving the data from the other storage controller, respectively converts the count value of the each record in this data to the first cylinder number.

In a fourth aspect according to any of the first through the third aspects, the control information creation unit creates and stores the control information for each cylinder when the mainframe makes a format write request to the virtual volume.

In a fifth aspect according to any of the first through the fourth aspects, the other storage controller comprises another control information creation unit, which is for creating another control information related to the formats of the respective real volumes, and which stores the other control information created for each cylinder in accordance with the format write request in a control information area inside the real volume, and when the mainframe makes a format write request to the virtual volume, the converter converts the format write request to a format write request for the respective real volumes, and sends this request to the other storage controller, and the control information creation unit creates control information related to the format of the virtual volume in synch with the creation of the other control information by the other control information creation unit.

In a sixth aspect according to any of the first through the fifth aspects, the control information is information for storing the data size of each record of each track constituting a cylinder.

A seventh aspect according to the third aspect further comprises a cylinder number correction table for correcting a cylinder number based on the corresponding relationship between the storage area of the virtual volume and the storage areas of the respective real volumes, and the command converter and data converter use the cylinder number correction table to carry out the conversions of the first cylinder number and the second cylinder number.

In an eighth aspect according to any of the first through the seventh aspects, the storage areas of the respective real volumes, which can be used by the user, are associated with the virtual volume storage area in order from the start thereof.

A mainframe volume virtualization method according to a ninth aspect is a mainframe volume virtualization method for combining a plurality of mainframe real volumes of another storage controller into a single virtual volume, and providing this virtual volume to the mainframe, and respectively executes steps for: creating control information related to the format of the virtual volume, associating the created control information with the virtual volume, and storing this created control information associated with the virtual volume in a prescribed real storage area when the mainframe makes a format write request to the virtual volume; respectively creating another control information related to the formats of the respective real volumes inside the other storage controller by converting the format write request to a format write request for the respective real volumes associated with the virtual volume, and sending this request to the other storage controller; determining whether or not a data size stored in the control information coincides with a data size specified by the mainframe when a write command for the virtual volume is received from the mainframe; storing write-data received from the mainframe to a cache memory, and notifying the mainframe to the effect that write command processing has been completed when the data size stored in the control information coincides with the data size specified by the mainframe; issuing a read command to the other storage controller, and requesting the other storage controller for prescribed data related to the write command when the data size stored in the control information does not coincide with the data size specified by the mainframe; and processing the write command received from the mainframe based on the data received from the other storage controller.

A tenth aspect according to the ninth aspect further comprising a step of sending the write data stored in the cache memory to the other storage controller, and storing this data in the corresponding real volume of the respective real volumes subsequent to the step of processing the write command.

A computer program according to an eleventh aspect is a computer program for causing a computer to function as a virtualization device for combining a plurality of mainframe real volumes of another storage controller into a single virtual volume, and providing this virtual volume to a mainframe, and causes the computer to realize a conversion function for converting a command and data received from the mainframe to a command and data to be sent to the other storage controller, and for converting data received from the other storage controller to data to be sent to the mainframe; a control information creation function for creating control information related to the format of the virtual volume, and managing this control information by associating same with the virtual volume; and a command processing function for using the conversion function and the control information creation function to process the command issued from the mainframe, and for notifying the mainframe of the result of this processing.

A host computer shared storage apparatus according to a twelfth aspect is a host computer storage controller connected to a host computer and another storage controller, the other storage controller comprises a plurality of host computer real volumes, and the host computer storage controller comprises a virtual volume associated with the respective real volumes; a converter for converting a command and data received from the host computer to a command and data to be sent to the other storage controller, and for converting data received from the other storage controller to data to be sent to the host computer; a control information creation unit for creating control information related to the format of the virtual volume, and managing this control information by associating same with the virtual volume; and a command processor, which uses the converter and the control information creation unit to process a command issued from the host computer, and to notify the host computer of the result of this processing.

BRIEF DESCRIPTION OF THE DRAWINGS

FIG. 7 is a schematic diagram of an external connection management table;

FIG. 8 is a schematic diagram of a cylinder number correction table;

FIG. 12 is a flowchart of a destage process; and

FIG. 13 is a flowchart of a read process.

DESCRIPTION OF THE SPECIFIC EMBODIMENTS

The aspects of the embodiment of the present invention will be explained hereinbelow on the basis of the figures. As will be explained in detail below, in this embodiment, a plurality of real volumes 2B(1) through 2B(3) residing inside another storage controller 2 are virtualized as a single virtual volume 1B and provided to a mainframe.

Figure 1:
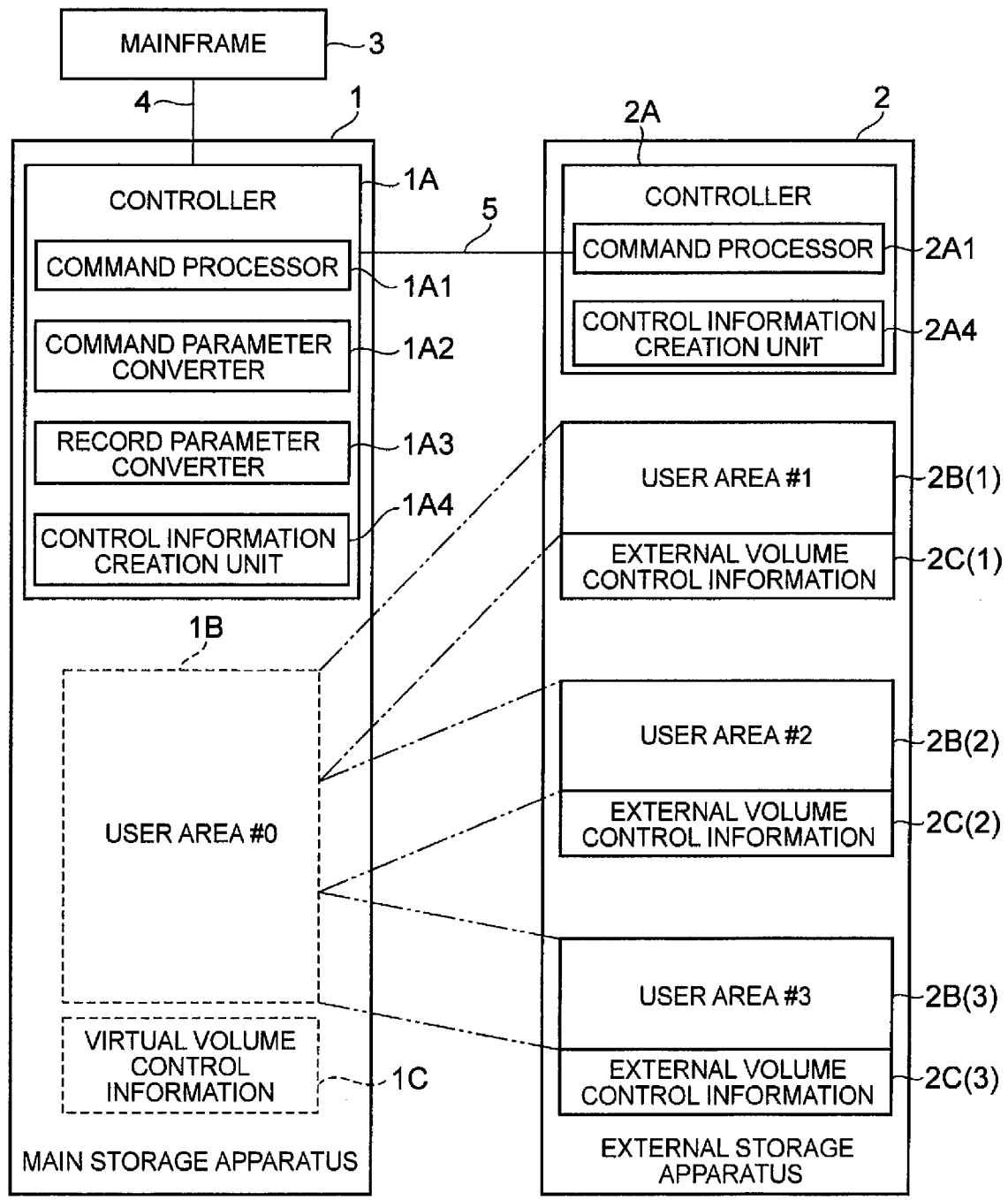
FIG. 1 is a schematic diagram showing the concept of an embodiment of the present invention.

FIG. 1 is a schematic diagram showing an overview of this embodiment. This information processing system comprises a main storage apparatus 1 as the "mainframe storage controller", an external storage apparatus 2 as the "other storage controller", and a mainframe 3. The external storage apparatus 2 is called the external storage apparatus here because, from the perspective of the main storage apparatus 1, it is a storage apparatus that exists external to the main storage apparatus 1.

The mainframe 3 is a large-scale general-purpose computer used primarily in the core operations of a company or the like. In the mainframe 3, block data is recorded on a disk in accordance with a recording system called a CKD (Count Key and Data) architecture. By contrast, in the case of an open system, block data is recorded in accordance with a recording system called FBA (Fixed Block Architecture).

In the CKD architecture, three types of data—a count part, key part, and data part—are recorded in each record (each block). The number and data size of the record are stored in the count part, and a key, which constitutes a search target, is stored in the key part. The data itself, which is recorded in this record, is stored in the data part.

The mainframe 3 and the main storage apparatus 1 are connected by way of a communication network 4. The communication network 4, for example, is configured as an FC-SAN (Fibre Channel-SAN (Storage Area Network)). The mainframe 3 and the main storage apparatus 1, for example, carry out two-way communications using a communication protocol, such as FICON (Fibre Connection: registered trademark), ESCON (Enterprise System Connection: registered trademark), ACONARC (Advanced Connection Architecture: registered trademark), or FIBARC (Fibre Connection Architecture: registered trademark).

The main storage apparatus 1 and the external storage apparatus 2 are connected by way of a communication network 5. This communication network 5, for example, can be configured as a FC-SAN the same as communication network 4.

The main storage apparatus 1 comprises a controller 1A; a virtual volume 1B; and control information 1C. The controller 1A, for example, comprises a command processor 1A1; command parameter converter 1A2; record parameter converter 1A3; and control information creation unit 1A4.

The command processor 1A1 executes a process based on a command issued from the mainframe 3, and returns the result of this processing to the mainframe 3.

The command parameter converter 1A2 as the "command converter" corrects a parameter in a command in order to convert a command received from the mainframe 3 to a command for use in the external storage apparatus 2. The correction-target parameter is the cylinder number.

The record parameter converter 1A3 as the "data converter" corrects parameters in the respective records of the data received from the mainframe 3, and in addition, corrects parameters in the respective records of the data received from the external storage apparatus 2. The correction-target parameter is the cylinder number in the count part.

The control information creation unit 1A4 creates control information 1C related to the format of the virtual volume 1B and stores this information in a prepared real storage area during a virtual volume 1B format write. The real storage area for storing the control information 1C, for example, can include a memory device or hard disk device inside the main storage apparatus 1.

The external storage apparatus 2 comprises a controller 2A; a plurality of real volumes 2B(1) through 2B(3); and control information 2C(1) through 2C(3) for each real volume 2B(1) through 2B(3). Furthermore, when there is no particular need to distinguish between them in the following explanation, the real volumes 2B(1) through 2B(3) may be called real volume 2B, and the control information 2C(1) through 2C(3) may be called control information 2C.

The controller 2A, for example, comprises a command processor 2A1; and a control information creation unit 2A4. The command processor 2A1 carries out processing in accordance with a command received from the main storage apparatus 1, and returns the result of this processing to the main storage apparatus 1. The control information creation unit 2A4 respectively creates control information 2C related to the formats of the respective real volumes 2B, and stores this control information 2C in the respective real volumes 2B during a format write to the respective real volumes 2B.

The virtual volume 1B is a logical volume virtually provided inside the main storage apparatus 1. The virtual volume 1B is in reality the respective real volumes 2B inside the external storage apparatus 2. The storage areas of the respective real volumes 2B are allocated in order from the beginning of the virtual volume 1B. That is, if the virtual storage area of the virtual volume 1B is divided into three parts, the real storage area of the first real volume 2B(1) is associated with a first virtual storage area, the real storage area of the second real volume 2B(2) is associated with a second virtual storage area, and the real storage area of the third real volume 2B(3) is associated with a third virtual storage area.

The mainframe 3 can execute a write command or a read command to the virtual volume 1B without being aware in the least as to where the virtual volume 1B actually resides. The actual reading and writing of data is carried out to the real volumes 2B associated with the mainframe 3 access destination. The command processor 1A1 inside the controller 1A uses the respective converters 1A2, 1A3 to convert the command and write-data and send same to the external storage apparatus 2.

The respective real volumes 2B each comprise control information 2C. The respective control information 2C is created for each cylinder of these real volumes 2B. The respective real volumes 2B comprise a plurality of (a large number of) cylinders, and each cylinder comprises a large number of tracks. Furthermore, each track comprises a plurality of records.

The control information 2C is for managing the size of the respective records configuring the respective tracks of the respective cylinders. In other words, the control information 2C can also be thought of as bitmap information showing whether or not the respective tracks have been written to. When a format write is requested for a real volume 2B, the control information 2C is created by the control information creation unit 2A4 inside the controller 2A. The created control information 2C is stored in a control information storage area inside the real volume 2B.

The control information 1C of the virtual volume 1B is also created by the control information creation unit 1A4 during the format write the same as the control information 2C of the real volume 2B. However, the control information 1C of the virtual volume 1B is control information related to the virtual volume 1B, and in addition, differs from the control information 2C related to real volume 2B in that this control information 1C is stored in a real storage area that is different from virtual volume 1B.

The operation of this system will be explained. When the mainframe 3 requests a format write for virtual volume 1B, the controller 1A converts this format write request to a format write request for the respective real volumes 2B. The respective converters 1A2, 1A3 are used in this conversion process.

The external storage apparatus 2 formats the respective real volumes 2B in accordance with the format request received from the main storage apparatus 1. In so doing, the control information creation unit 2A4 respectively creates and stores the control information 2C of the real volumes 2B.

The control information creation unit 1A4 of the main storage apparatus 1 creates the control information 1C of virtual volume 1B based on the format write request from the mainframe 3, and stores this control information 1C in a real storage area prepared in advance. Consequently, the data sizes of the respective records comprising the respective tracks of the cylinders are ascertained for each cylinder of virtual volume 1B.

When the mainframe 3 issues a write command, the main storage apparatus 1 references control information 1C, and compares the size of the data that the mainframe 3 is attempting to write to a prescribed location of the virtual volume 1B against the data size set for this prescribed location at the time of the format write.

When the two data sizes coincide, the command processor 1A1 of the controller 1A stores the write-data received from the mainframe 3 in the cache memory inside the controller 1A, and reports to the mainframe 3 to the effect that write command processing is complete.

It is the mainframe 3 that issues the format write request, and sets how the virtual volume 1B will be used in the future. Therefore, the data size of a record set by the mainframe 3 will generally coincide with the data size of a record written by the mainframe 3. In the following explanation, a situation in which the data size of a record set at the time of the format write coincides with the data size of a record at the time of an update (a write) may be called an isometric write. An isometric write signifies writing data at a size equivalent to a preset size.

Unlike a read-modify-write, which updates and returns a portion of old data, in the case of an isometric write, write-data received from the mainframe 3 can be written as-is to a volume. That is, at the point in time at which the controller 1A stores the write-data received from the mainframe 3 in the cache memory inside the controller 1A, the controller 1A can report to the mainframe 3 to the effect that write command processing is complete. Therefore, in the case of an isometric write, the time required for write command processing can be shortened, and the write performance of the main storage apparatus 1 can be improved.

The write-data inside the cache memory is sent to the external storage apparatus 2 at a prescribed timing, and written to the disk drive comprising the real volume 2B. The process for writing the data in the cache memory to the disk drive will be called destaging. By contrast, the process for storing data in the cache memory will be called staging.

When the write-data is transferred from the main storage apparatus 1 to the external storage apparatus 2, the controller 1A converts the cylinder number in the write command to the cylinder number of the real volume 2B, and in addition, converts a portion of the count values in the respective records of the write-data to the cylinder number of the real volume 2B.

The controller 2A of the external storage apparatus 2 writes the write-data received from the main storage apparatus 1 to the real volume 2B in accordance with the write command received from the main storage apparatus 1. The controller 2A references the control information 2C related to the write-target real volume 2B, and determines whether or not the write is an isometric write. When the write is an isometric write, the controller 2A can report to the main storage apparatus 1 that write command processing is complete at the point in time at which the write-data is stored in the cache memory inside the controller 2A.

Configuring this embodiment like this makes it possible to combine the plurality of real volumes 2B for the mainframe into a single virtual volume 1B, and provide this virtual volume 1B to the mainframe 3. Therefore, the volume can be used effectively, and user ease-of-use can be enhanced.

Furthermore, this embodiment is not limited to a mainframe, but rather can also be applied to other computers. Also, the storage apparatus can be configured to directly carry out the transceiving of a command and data with the mainframe, or the storage apparatus can be configured to carry out the transceiving of a command and data by way of a host computer or the like.

Furthermore, in this embodiment, control information 1C related to the virtual volume 1B is created and stored at the time of a format write for the virtual volume 1B. Therefore, when an isometric write is requested from the mainframe 3, write processing can be completed immediately. This embodiment will be explained in detail below.

First Embodiment

Figure 2:
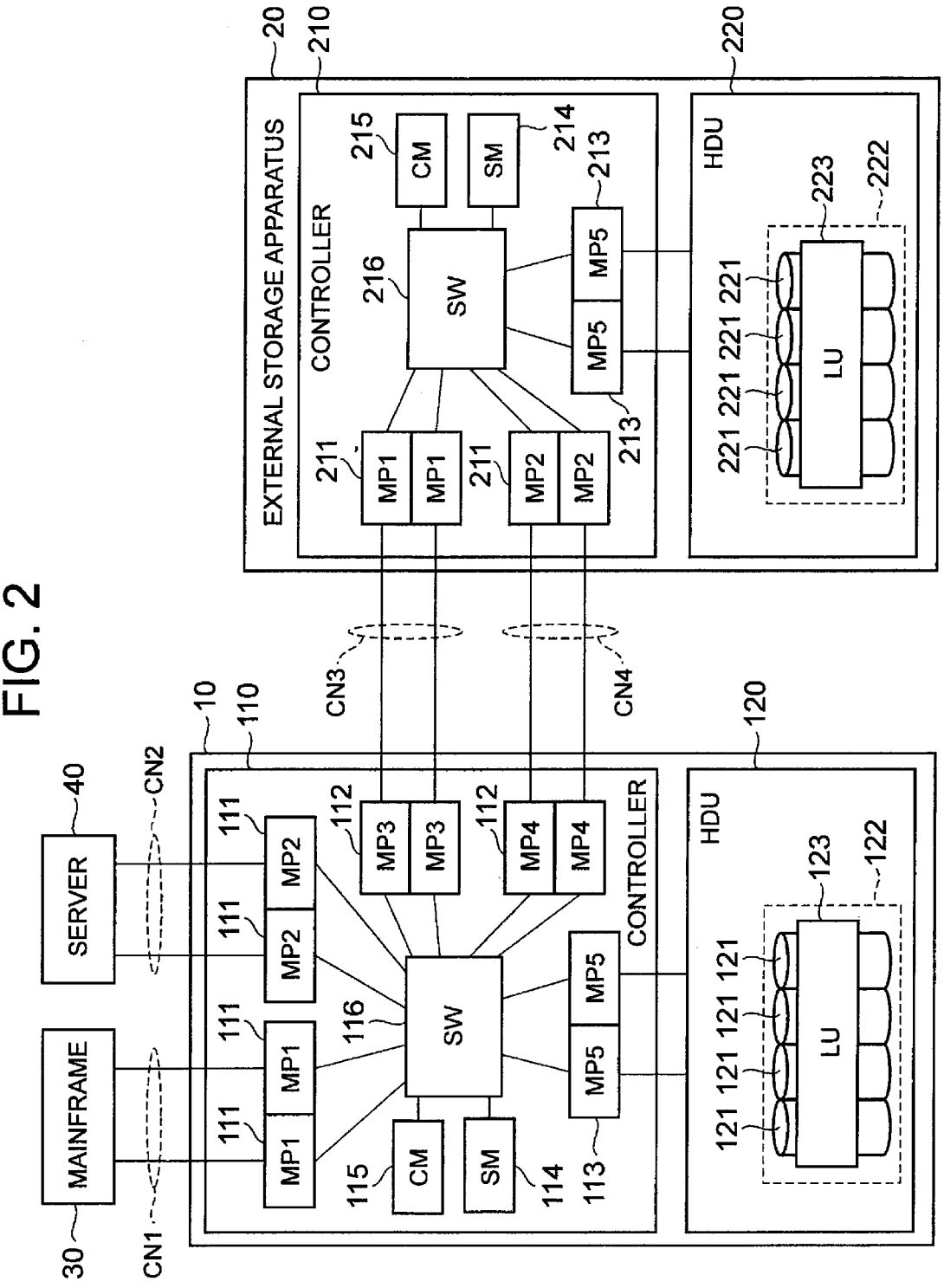
FIG. 2 is a schematic diagram showing the overall configuration of a system comprising a storage controller according to this embodiment.

FIG. 2 is a diagram schematically showing the overall configuration of an information processing system related to this embodiment. This system, for example, comprises a main storage apparatus 10; an external storage apparatus 20; a mainframe 30; and a server 40. The corresponding relationship with FIG. 1 will be explained. The main storage apparatus 10 corresponds to the main storage apparatus 1 of FIG. 1; the external storage apparatus 20 corresponds to the external storage apparatus 2 of FIG. 1; and the mainframe 30 corresponds to the mainframe 3 of FIG. 1. A controller 110 corresponds to the controller 1A of FIG. 1; and a controller 210 corresponds to the controller 2A of FIG. 1. Furthermore, the virtual volume 123V shown in FIG. 3 corresponds to the virtual volume 1B of FIG. 1; the external volume 223 shown in FIG. 3 corresponds to the real volume 2B of FIG. 1; control information T10(V) shown in FIG. 3 corresponds to control information 1C of FIG. 1; and control information T10(1) through T10(3) shown in FIG. 3 corresponds to control information 2C(1) through 2C(3) of FIG. 1.

As shown in FIG. 2, the main storage apparatus 10 is configured from a controller 110; and a disk mounting unit 120. The controller 110 controls the operation of the main storage apparatus 10. The disk mounting unit ("HDU" in the figure) 120 is mounted with a plurality of disk drives 121.

The main storage apparatus 10 of this embodiment incorporates the volume 223 of the external storage apparatus 20 inside the main storage apparatus 10, and provides this volume 223 to the mainframe 30 just as if it is a real volume inside the main storage apparatus 10. Therefore, the main storage apparatus 10 does not necessarily have to comprise disk drives 121. This is because, as described hereinabove, the main storage apparatus 10 is able to make use of the disk drives 121 inside the external storage apparatus 20. The present invention is realized even when the main storage apparatus 10 does not comprise disk drives 121 or a volume 123. In this case, the main storage apparatus 10 can be thought of as a volume virtualization device for the mainframe.

The configuration of the controller 110 will be explained. The controller 110, for example, comprises a plurality of microprocessors 111, 112, 113; a shared memory 114; cache memory 115; and connector 116.

The microprocessors 111, 112, 113 are control boards comprising microprocessors, memories, data transfer circuits, and communication interfaces. The first microprocessors 111 (MP1, MP2) are control boards for carrying out communication with either the mainframe 30 or the server 40 as a higher-level device. The second microprocessors 112 (MP3, MP4) are control boards for carrying out communications with the external storage apparatus 20. The third microprocessors 113 (MP5) are for carrying out communications with the respective disk drives 121.

Of the first microprocessors 111, the two microprocessors 111 (MP1) shown in the left side of FIG. 2 carry out communications with the mainframe 30 by way of a communication network CN1 for the mainframe. The two microprocessors 111 (MP2) shown in the right side of FIG. 2 of the first microprocessors 111 carry out communications with the server 40 by way of an open communication network CN2.

Similarly, the top two microprocessors 111 (MP3) of the second microprocessors 112 carry out mainframe communications with the external storage apparatus 20 by way of a communication network CN3 for mainframe use. The bottom two microprocessors 111 (MP4) of the second microprocessors 112 carry out open communications with the external storage apparatus 20 by way of an open communication network CN4. Mainframe communications, for example, conform to a communication protocol such as FICON or ESCON. Open communications, for example, conform to a communication protocol such as FCP (Fibre Channel Protocol).

In the system according to this embodiment, the virtualization of the mainframe volume and the virtualization of the open volume are intermixed. Hereinbelow, the virtualization of the mainframe volume will be explained. Furthermore, the first microprocessors 111 and the second microprocessors 112 may be called channel adapters. The third microprocessors 113 (MP5) will be called disk adapters.

The shared memory ("SM" in the figure) 114 stores various management information to be shared by the respective microprocessors 111, 112, 113. The cache memory ("CM" in the figure) 115 stores data received from the mainframe 30 or the server 40, and data received from the external storage apparatus 20.

The connector 116 respectively connects the respective microprocessors 111, 112, 113 to the shared memory 114 and the cache memory 115. The respective microprocessors 111, 112, 113 can access the shared memory 114 and cache memory 115 via the connector 116.

The disk mounting unit 120 comprises a plurality of disk drives 121. As the disk drives 121, for example, FC (Fibre Channel) disks, SCSI (Small Computer System Interface) disks, SATA disks, ATA (AT Attachment) disks, and SAS (Serial Attached SCSI) disks can be used.

Furthermore, the disk drives 121 are not limited to hard disk devices, and, for example, semiconductor memory devices (to include flash memory devices), optical disk devices, magneto-optical disk devices, magnetic tape devices, flexible disk devices, and various other nonvolatile storage devices capable of reading and writing data can be used.

The physical storage areas of the respective disk drives 121 can be grouped together into a RAID group 122, and either one or a plurality of logical volumes 123 can be set in this grouped storage area. For example, using a plurality of disk drives 121 grouped into a set of four drives, it is possible to create a redundant physical storage area, and to provide a logical storage area on top of this redundant storage area. Furthermore, it is also possible to provide a plurality of logical volumes 123 on top of a single disk drive 121.

The external storage apparatus 20, similar to the main storage apparatus 10, comprises a controller 210, which controls overall operation; and a disk mounting unit 220, which provides a storage area. The controller 210 comprises microprocessors 211 (MP1, MP2) for carrying out communications with the main storage apparatus 10; microprocessors 213 (MP5) for carrying out communications with disk drives 221; a shared memory 214; cache memory 215; and connector 216.

The microprocessors 211 (MP1) carry out mainframe communications with the main storage apparatus 10. The microprocessors 211 (MP2) carry out open communications with the main storage apparatus 10.

The disk mounting unit 220 comprises a plurality of disk drives 221. One or more logical volumes 223 can be provided in a RAID group 222. A logical volume 223 inside the external storage apparatus 20 is a real volume comprising real storage areas for storing data. Because a real volume resides inside the external storage apparatus 20, in the following explanation, this volume may be called the external volume 223.

Figure 3:
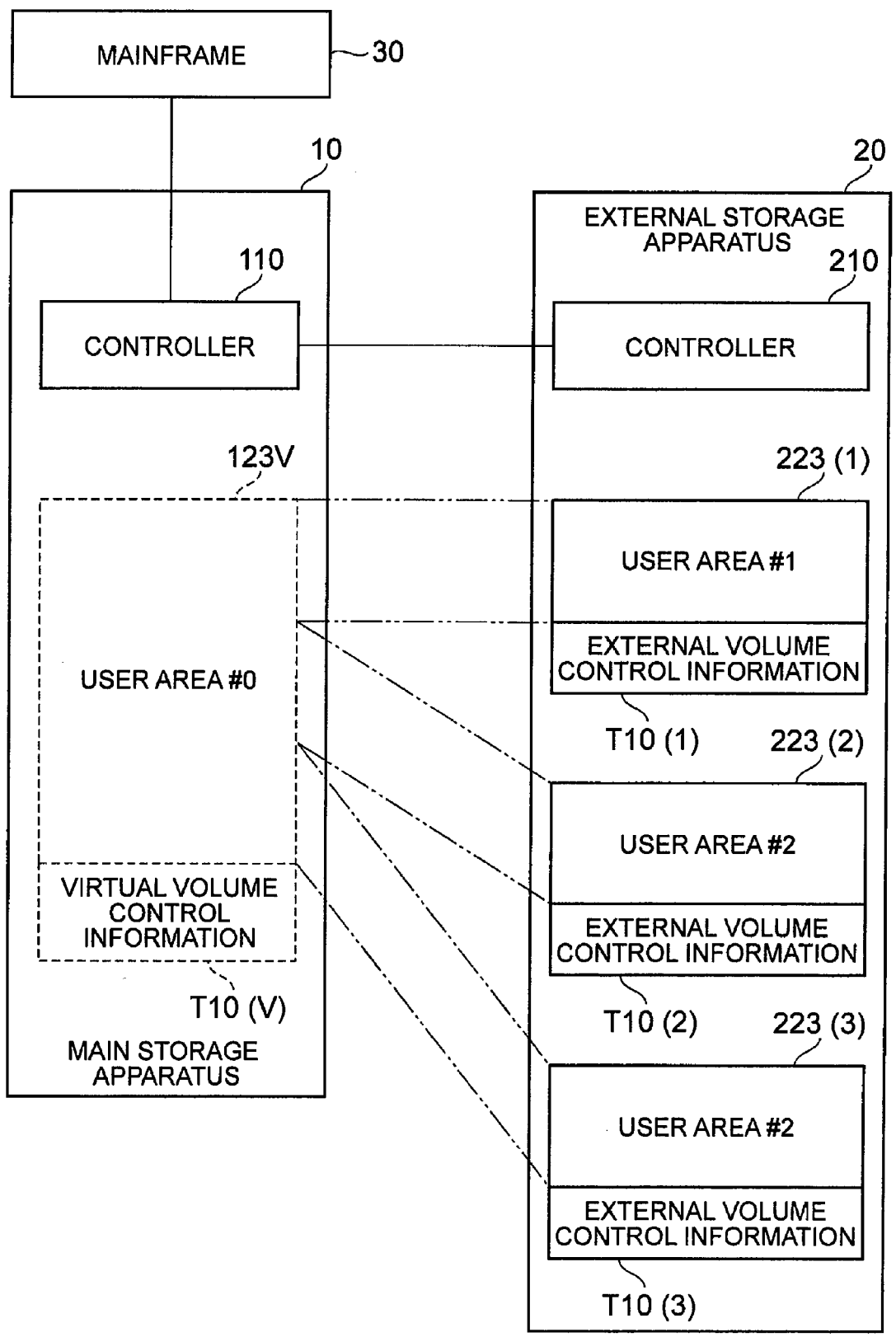
FIG. 3 is a diagram schematically showing an overview of correspondence and control information between a virtual volume and respective external volumes.

The relationship between the virtual volume 123V and the external volume 223, and the relationship between the respective volumes 123V, 223 and the control information T10(V) and T10(1) through T10 (3) will be explained on the basis of FIG. 3.

The virtual volume 123V is provided inside the main storage apparatus 10. A plurality of external volumes 223 is associated with the storage area (user area #0) of the virtual volume 123V in order from the beginning thereof. This will be explained hereinbelow using FIG. 4.

Figure 4:
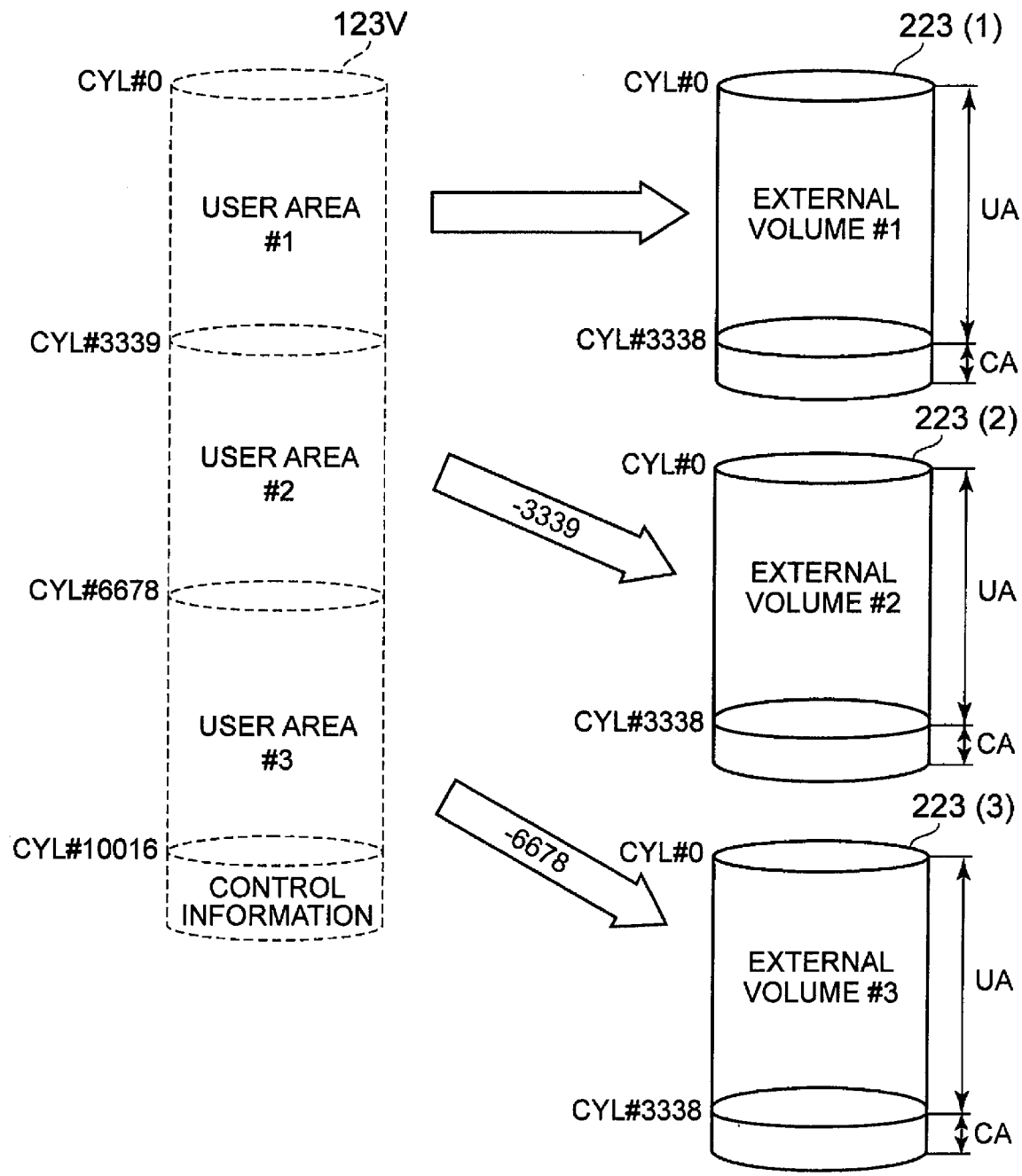
FIG. 4 is a diagram schematically showing an example of the specific corresponding relationship between the virtual volume and the respective external volumes.

The respective external volumes 223 comprise a user area (UA in FIG. 4) and a control information storage area (CA in FIG. 4). User data is stored in the user area. Control information T10 is stored in the control information storage area. The configuration of the control information T10 will be explained hereinbelow using FIG. 6. Briefly stated, the control information T10 is information showing how the respective tracks of the user area are to be used.

The control information T10(V) is also associated with the virtual volume 123V. Since the virtual volume 123V exists virtually without a physical unit, the control information T10 (V) is stored in a prescribed storage area prepared in advance. The prescribed storage area, for example, can include the logical volume 123 and shared memory 114 inside the main storage apparatus 10.

FIG. 4 is a schematic diagram showing the corresponding relationship between the virtual volume 123V and the plurality of external volumes 223. It is supposed that the virtual volume 123V has a total of 10017 cylinder numbers, ranging from cylinder number (also called CYL# hereinafter) 0 to cylinder number 10016. It is supposed that the respective external volumes 223 each have a total of 3339 cylinders, ranging from CYL#0 to CYL#3338.

The first external volume 223(1) is associated with the area of the virtual volume 123V from CYL#0 to CYL#3338. The second external volume 223(2) is associated with the area of the virtual volume 123V from CYL#3339 to CYL#6677. The third external volume 223(3) is associated with the area of the virtual volume 123V from CYL#6678 to CYL#10016. That is, the virtual volume 123V is configured by linking the storage areas of the plurality of external volumes 223.

This will be explained in detail hereinbelow, but when the mainframe 30 accesses the first area (user area #1) of the virtual volume 123V, the controller 110 can access external volume 223(1) without changing the cylinder number in the command or the count value in the record.

When the mainframe 30 accesses the second area (user area #2) of the virtual volume 123V, the controller 110 must correct the cylinder number specified by the write command and the count value in the record. This is because the respective cylinder numbers of the second area of the virtual volume 123V do not coincide with the cylinder numbers of the external volume 223(2) associated with the second area. In this case, the controller 110 subtracts 3339 from the CYL# specified by the mainframe 30, and issues a command to the external storage apparatus 20. Similarly, when the mainframe 30 accesses the third area (user area #3) of the virtual volume 123V, the controller 110 subtracts 6678 from the CYL# specified by the mainframe 30, and issues a command to the external storage apparatus 20.

When the mainframe 30 reads data from the virtual volume 123V, the count values of the respective records of the data read out from the external volume 223 are also corrected. Furthermore, the values of the CYL# shown in FIG. 4 are just an example, and the present invention is not limited to these values.

Figure 5:
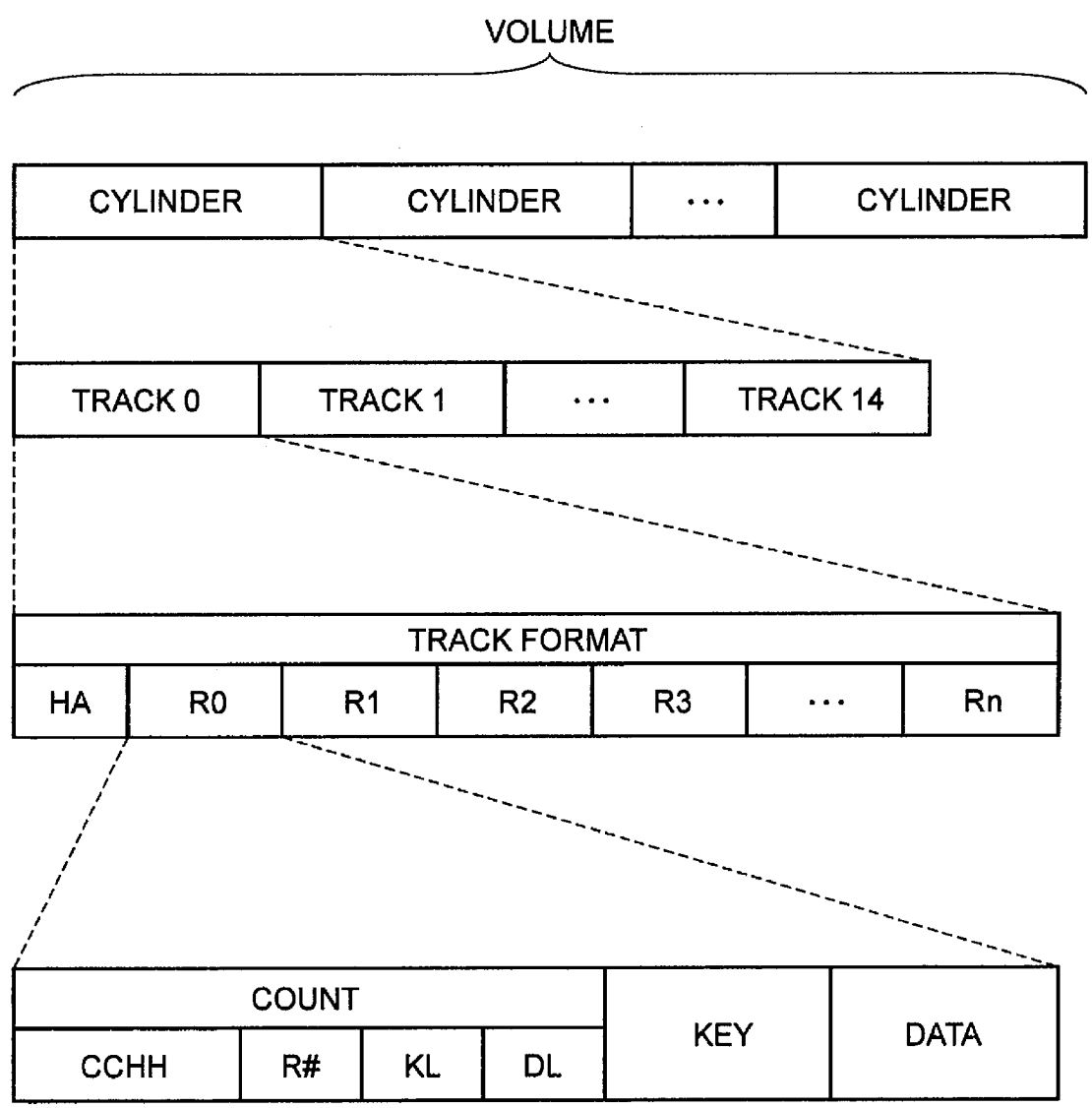
FIG. 5 is a schematic diagram showing the storage configuration inside a volume.

FIG. 5 is a diagram schematically showing the configuration of a volume. The volumes (the virtual volume 123V and respective external volumes 223), as shown in FIG. 4, each comprise a large number of cylinders.

The respective cylinders are each comprised from 15 tracks. The respective tracks comprise a header ("HA" in the figure), and a plurality of records R0 through Rn. As shown at the bottom of FIG. 5, the respective records comprise a count part ("COUNT" in the figure); a key part ("KEY" in the figure); and a data part ("DATA" in the figure). For this reason, this format is called the CKD format.

The count part comprises address information ("CCHH" in the figure); a logical record number ("R#" in the figure); key length ("KL" in the figure); and data length ("DL" in the figure). The CC portion of the CCHH of the address information shows the logical cylinder address (CYL#); and the HH portion shows the logical start address (track number).

Thus, in the mainframe storage system, information showing the address, key length and data length is included inside the respective records of the respective data. By contrast to this, in an open storage system, the logical block data itself is stored in order, and the reading and writing of data is possible by simply specifying the lead logical block address and the number of logical blocks.

Figure 6:
FIG. 6 is a schematic diagram showing the configuration of control information.
Figure 6:
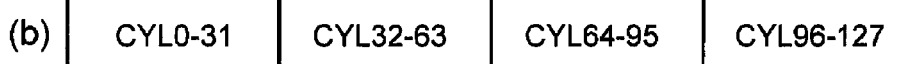
Figure 6:
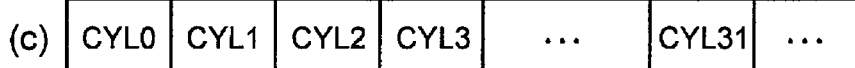
Figure 6:
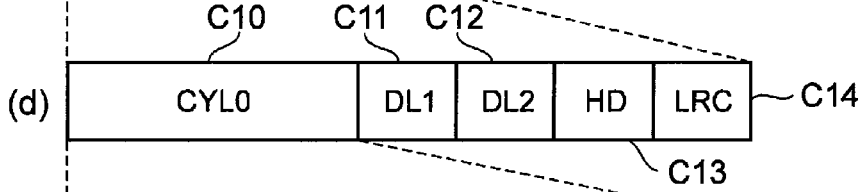
Figure 6:
Figure 6:
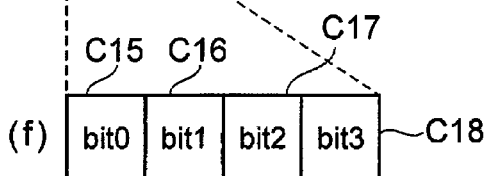

FIG. 6 is a schematic diagram showing the configuration of the control information. The configurations of the control information T10(V) of the virtual volume 123V, and the control information T10(1) through T10(3) of the respective external volumes 223 are as shown below. When there is no need to distinguish between T10(V) and T10(1) through T10(3) hereinafter, T10 will be shown. The control information T10 is created and stored whenever the mainframe 30 requests a CKD format write.

As shown in FIG. 6(a), the respective volumes comprise a large number of cylinders. All the cylinders inside a volume are divided up and managed in a prescribed number of groups. As shown in FIG. 6(b), the respective cylinder groups are divided up and managed in a separate prescribed number of sub-groups. As shown in FIGS. 6(c) and (d), control data C10 through C14 are associated with the respective cylinders inside the respective sub-groups. That is, the control information T10 is respectively provided for each of the cylinders.

Control data C10 is a bitmap for each track (a track may be shown as "HD" in the figure) configuring the cylinder. Control data C11 is a first data size. Control data C12 is a second data size. Control data HD is information related to a track. Control data LRC (Longitudinal Redundancy Check) is a parallel parity check value. Since HD and LRC are not directly related to the present invention, further explanation of these control data will be omitted.

As shown in FIGS. 6(e) and (f), four bits (C15 through C18) are allocated for each track. C15 shows whether the respective records inside the track are standard records or nonstandard records. For standard records, 0 is set in C15. For nonstandard records, 1 is set in C15. C16 is a spare bit, and is not used.

The two bits C17 and C18 are information showing the size of the respective records configuring the track. Hereinafter, the two bits of C17 and C18 will be called the determination bits. When the size coincides with a first data size DL1, 10 is set in the determination bits. When the size coincides with a second data size DL2, 01 is set in the determination bits. When the size does not coincide with either the first data size or the second data size, 00 is set in the determination bits.

As shown in FIG. 6, control information is created for each cylinder. The size of the records written to the respective tracks is shown in the control information of the respective cylinders for all the tracks inside the relevant cylinder.

FIG. 7 shows the configuration of the management table T20, which is used in order for the main storage apparatus 10 to access the external storage apparatus 20. This table T20, for example, makes a virtual volume number C21, port number C22, external storage apparatus number C23, port number C24, and external volume number C25 correspondent to one another.

The virtual volume number C21 is information for identifying the virtual volume 123V inside the main storage apparatus 10. The port number C22 is information for identifying the communication port used for sending a command and data from the main storage apparatus 10 to the external storage apparatus 20. The external storage apparatus number C23 is information for identifying the external storage apparatus 20. The port number C24 is information for identifying the communication port associated with the external volume 223. The external volume number C25 is information for identifying the external volume 223.

As is clear from the configuration of table T20, the external volumes respectively possessed by a plurality of external storage apparatuses can be associated with a single virtual volume 123V. Furthermore, other items besides the items shown in FIG. 7 can be managed in the table T20. For example, the type of the disk drives configuring the external volume 223; volume size; RAID level; and free capacity can also be managed.

FIG. 8 shows the configuration of a table T30 used for correcting (converting) the parameter in a command and the count value in a record. This table T30, for example, correspondingly manages an external volume number C31; virtual volume area C32; and cylinder number correction value C33. The cylinder number correction value C33 comprises a seek process correction value C331; write process correction value C332; and read process correction value C333.

The external volume number C31 is information for identifying the respective external volumes 223. The value of C31 is equivalent to the value of C25 shown in FIG. 7. The virtual volume area C32 is information showing the area of the virtual volume 123V with which the external volume 223 has been associated.

The cylinder number correction value C33 is a cylinder number correction value used when sending a command to the external storage apparatus 20. The correction value corresponding to the virtual volume area C32 is respectively set for each of a seek process, write process and read process.

Figure 9:
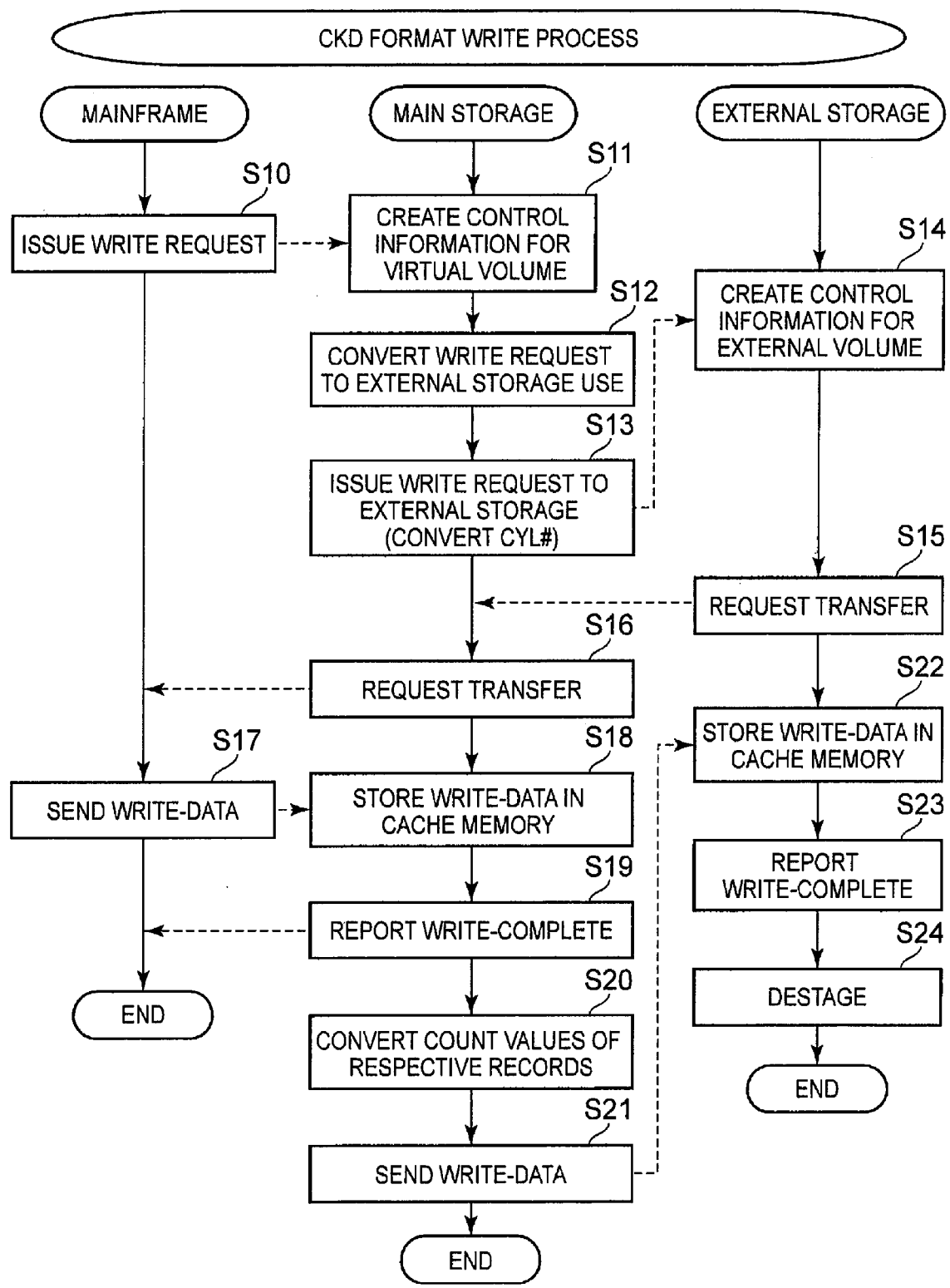
FIG. 9 is a flowchart of a format write process.

FIG. 9 is a flowchart showing a CKD format write process. The respective flowcharts shown hereinbelow show overviews of the respective processing, and may differ from an actual computer program. A so-called person having ordinary skill in the art should be able to change or delete the steps shown in the figures, or add a new step.

The CKD format write process sets the volume utilization method. When the mainframe 30 issues a format write request (S10), the main storage apparatus 10 creates control information T10(V) for the virtual volume 123, and stores this information T10(V) in a prescribed storage area (for example, the shared memory 114) (S11).

The main storage apparatus 10 uses the cylinder number correction table T30 to convert the format write request received from the mainframe 30 to a format write request for the external storage apparatus 20 (S12). The main storage apparatus 10 uses the external connection management table T20 to send the format write request converted in S12 to the external storage apparatus 20 (S13).

The external storage apparatus 20, upon receiving the format write request from the main storage apparatus 10, creates control information T10 (any of (1) through (3)) for the external volume 223 specified by this format write request (S14). The created control information is stored in the control information storage area of the external volume 223.

The external storage apparatus 20 requests a data transfer from the main storage apparatus 10 (S15). Upon receiving this request, the main storage apparatus 10 requests a data transfer from the mainframe 30 (S16).

The mainframe 30 transfers the write-data to the main storage apparatus 10 (S17). This write-data, for example, is data 0. The main storage apparatus 10 stores the write-data received from the mainframe 30 in the cache memory 115 (S18), and reports to the mainframe 30 to the effect that write command processing is complete (S19).

The main storage apparatus 10 converts the count values comprising the respective records of the write-data to the cylinder numbers of the external volume 223 (S20), and sends this post-conversion write-data to the external storage apparatus 20 (S21).

The external storage apparatus 20 stores the write-data received from the main storage apparatus 10 in the cache memory 215 (S22), and reports to the main storage apparatus 10 to the effect that write command processing is complete (S23). Thereafter, the external storage apparatus 20 writes the write-data stored in the cache memory 215 to the external volume 223 at a prescribed timing (S24).

Figure 10:
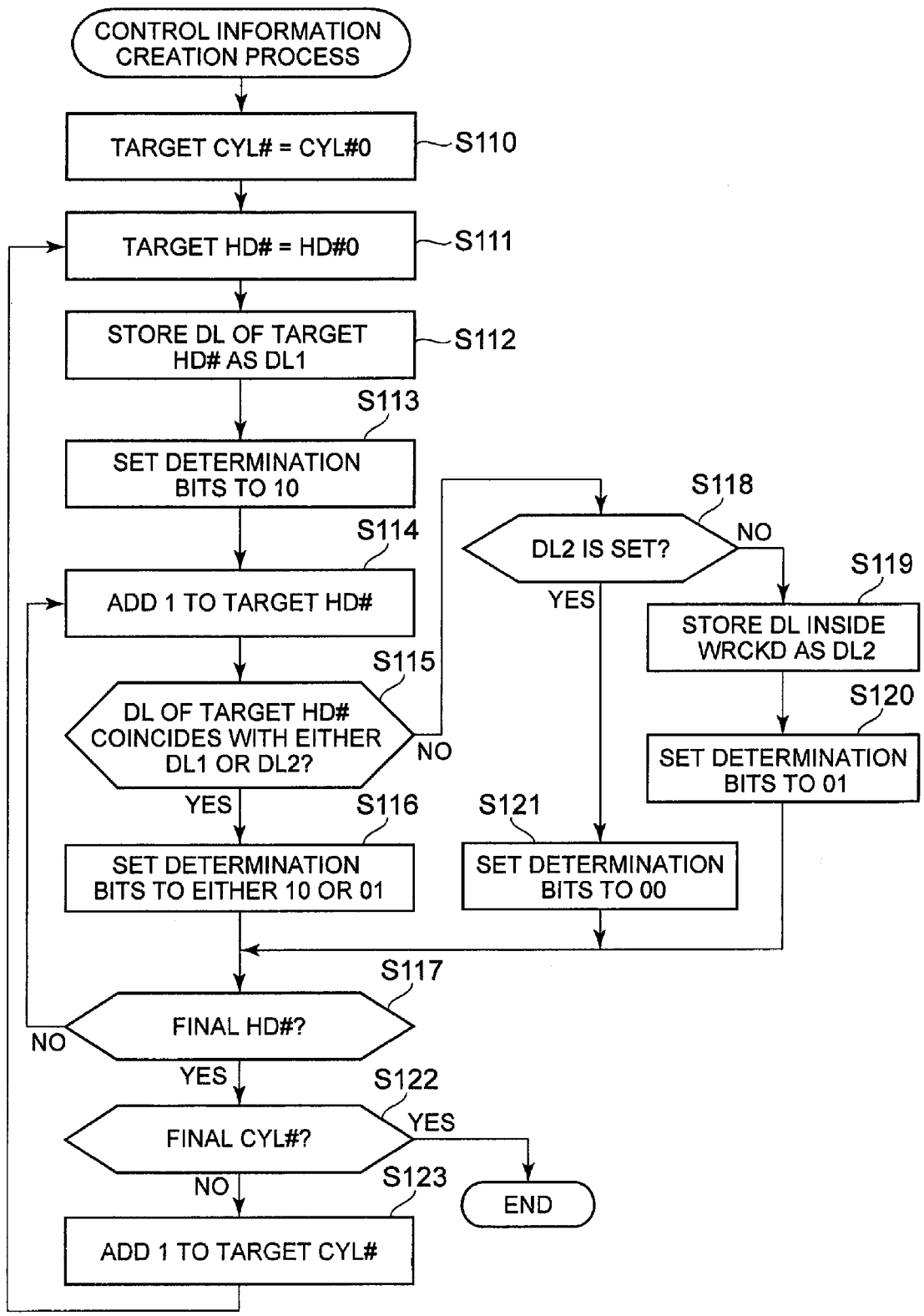
FIG. 10 is a flowchart showing the process for creating control information.

FIG. 10 is a flowchart showing the control information creation method presented in S11 and S14 of FIG. 9. As will be described hereinbelow, the respective tracks of the respective cylinders are formatted in order, and control information is created for all of the virtual volume 123V and respective external volumes 223.

When the controller (either 110 or 210) formats the first track of the initial cylinder (S110) (S111), the controller stores the data size (DL) specified by the command (WRCKD) as the first data size DL1 (S112), and sets the determination bits to 10 (S113).

When the controller formats the subsequent track (HD#1) (S114), the controller determines whether or not the command-specified data size (DL) for this track coincides with the first data size DL1 already stored (S115).

When the data sizes coincide (S115: YES), 10 is set in the determination bits of this track (S116). When the data sizes do not coincide (S115: NO), the controller determines whether or not a second data size DL2 has been set (S118). Since the second track (HD#1) is being explained here, the second data size DL2 has not been set yet (S118: NO). Accordingly, the controller sets the data size specified by the command (WRCKD) for DL2 (S119), and sets 01 in the determination bits (S120).

Then, the controller determines whether or not it is the final track of the process-target cylinder (S117). Since the process-target track is HD#1, and is not the final track (S117: NO), processing returns to S114, and increments the number of the process-target track by one. That is, the process-target track becomes HD#2.

The controller determines whether or not the data size specified for HD#2 coincides with either one of post-set DL1 or DL2 (S115). When the data size of HD#2 coincides with DL1 (S115: YES), the controller sets 10 in the determination bits (S116). When the data size of HD#2 coincides with DL2 (S115: YES), the controller sets 01 in the determination bits (S116).

When the data size specified for HD#2 does not coincide with either DL1 or DL2 (S115: NO), since DL2 has already been set (S118: YES), the controller sets 00 in the determination bits (S121).

Furthermore, in the above description, a situation, in which the data size specified by HD#0 was set in DL1, and the data size specified by HD#1 was set in DL2 without the HD#0 and the HD#1 data sizes coinciding, was explained. If the HD#0 data size coincides with the HD#1 data size (HD#0 data size=HD#1 data size=DL1) and the HD#2 data size does not coincide with DL1 (S115: NO, S118: NO), the HD#2 data size is set in DL2 (S119).

The control information of the process-target cylinder is established by executing the above processing (S111 through S121) from the first track to the last track of the respective cylinders. The control information is set for all the cylinders inside the volume by executing the above-described processing for each cylinder of the volume (S122, S123). For a real volume like the external volume 223, control information is set only for the user area which stores the user data.

Figure 11:
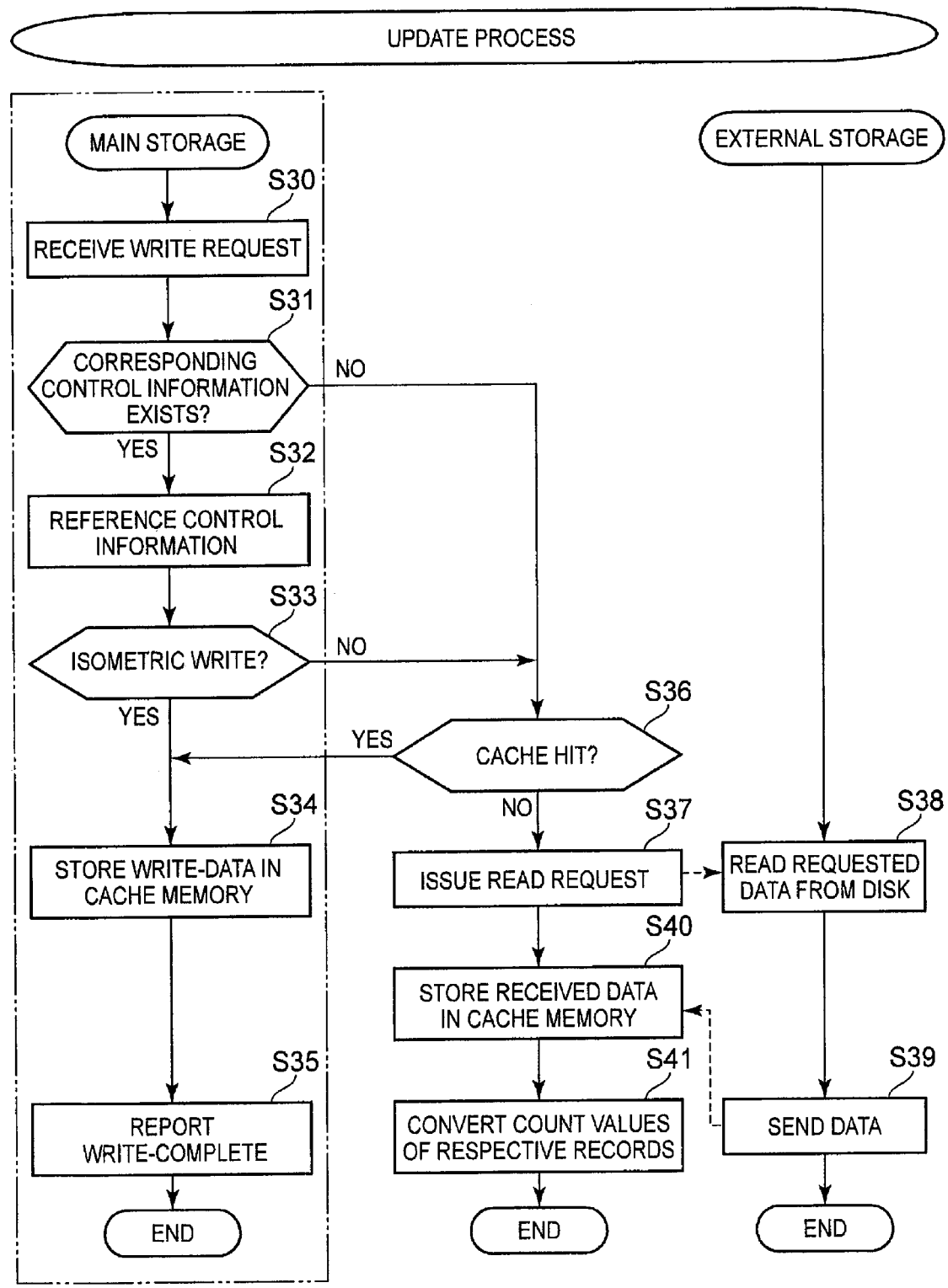
FIG. 11 is a flowchart of an update process.

FIG. 11 is a flowchart showing an update process for the virtual volume 123V. The main storage apparatus 10, upon receiving a write command from the mainframe 30 (S30), determines whether or not the main storage apparatus 10 holds the control information related to the write-destination track specified by this write command (S31).

When the control information exists (S31: YES), the main storage apparatus 10 reads the control information from either the shared memory 114 or the disk drive 121, stores this control information in the cache memory 115, and references the control information related to the write-destination track (S32).

The main storage apparatus 10 determines whether or not the write size specified by the mainframe 30 coincides with the data size set in the control information, that is, whether or not the write is an isometric write (S33).

When the write is an isometric write (S33: YES), the main storage apparatus 10 stores the write-data received from the mainframe 30 in the cache memory 115 (S34), and reports to the mainframe 30 to the effect that write command processing is complete (S35).

As described hereinabove, in this embodiment, at the time of a format write for the external volume 223, control information is created and held for the virtual volume 123V as well. Therefore, under ordinary circumstances, since the write size specified by the mainframe 30 will coincide with the data size inside the control information, update processing is completed within the scope (S31 through S35) shown by the dashed two-dot line in FIG. 11. That is, the main storage apparatus 10 can notify the mainframe 30 that write command processing has been completed at the point in time at which the write-data is stored in the cache memory 115, and can carry out the destage process at a different time.

When either the main storage apparatus 10 does not hold the control information related to the write-destination track (S31: NO), or the write is not an isometric write (S33: NO), the main storage apparatus 10 determines whether or not the update-target data exists in the cache memory 115 (S36).

When the update-target data is stored in the cache memory 115 (S36: YES), the main storage apparatus 10 merges the data received from the mainframe 30 together with the update-target date in the cache memory 115 (S34). The main storage apparatus 10 notifies the mainframe 30 that write command processing is complete (S35).

When the update-target data is not stored in the cache memory 115 (S36: NO), the main storage apparatus 10 issues a read command to the external storage apparatus 20 to acquire the update-target data (S37). The parameter (cylinder number) in the read command is set in the cylinder number of the read-target external volume 223. The main storage apparatus 10, upon issuing the read command to the external storage apparatus 20, suspends write command processing with the mainframe 30.

Upon receiving the read command from the main storage apparatus 10, the external storage apparatus 20 reads out the requested data from the external volume 223 (S38), and sends this data to the main storage apparatus 10 (S39).

The main storage apparatus 10 stores the data received from the external storage apparatus 20 in the cache memory 115 (S40). The main storage apparatus 10 converts the count value in the received data to a count value that corresponds to the virtual volume 123V in the cache memory 115 (S41). Thereafter, when the update is requested once again by the mainframe 30 for the same write destination, the determination in S36 is YES, and the main storage apparatus 10 proceeds to steps S34 and S35.

FIG. 12 is a flowchart showing a destage process for writing the write-data stored in the cache memory 115 of the main storage apparatus 10 to the external volume 223 inside the external storage apparatus 20.

The main storage apparatus 10 issues a write command to the external storage apparatus 20 (S50). Upon receiving a transfer request from the external storage apparatus 20 (S51), the main storage apparatus 10 converts the count values of the respective records of the destage-target data to cylinder numbers inside the external volume 223, which is the write destination (S52). The main storage apparatus 10 sends the destage-target data (that is, the write-data), which is stored in the cache memory 115, to the external storage apparatus 20 (S53).

The external storage apparatus 20 stores the data received from the main storage apparatus 10 in the cache memory 215 (S54), and reports to the main storage apparatus 10 that write command processing is complete (S55). Thereafter, the external storage apparatus 20 waits for the prescribed timing to write the data stored in the cache memory 215 to the disk drive 221 comprising the external volume 223 (S56).

Furthermore, in the above description, a situation, in which the completion of write command processing and the write to the disk drive 221 are asynchronous, is explained. Instead, the configuration can also be such that the completion of write command processing is notified to the main storage apparatus 10 subsequent to the data being written to the storage area of the disk drive 221 comprising the external volume 223.

FIG. 13 is a flowchart showing a read process for the mainframe 30 to read out data from the virtual volume 123V. The mainframe 30 issues a read command to read out data from the virtual volume 123V (S60). The main storage apparatus 10 converts the parameter (cylinder number) in the read command received from the mainframe 30 to the cylinder number inside the read-target external volume 223, and issues the read command to the external storage apparatus 20 (S61).

That is, the main storage apparatus 10 specifies the cylinder number of the external volume 223 associated with the read-target area of the virtual volume 123V, creates a new read command, and issues this new read command to the external storage apparatus 20.

The external storage apparatus 20, upon receiving the read command from the main storage apparatus 10 (S62), reads out the data from the external volume 223, and send this data to the main storage apparatus 10 (S63).

The main storage apparatus 10 stores the data received from the external storage apparatus 20 in the cache memory 115 (S64), and rewrites the count values of the respective records in the received data to correspond to the virtual volume 123V (S65). That is, the main storage apparatus 10 rewrites the CC values of the count parts in the respective records of the received data in the cache memory 115 to virtual volume 123V cylinder numbers.

Then, the main storage apparatus 10 sends the data, for which the count values have been rewritten, to the mainframe 30 (S66). Consequently, the mainframe 30 can read out the data from the virtual volume 123V (S67).

Since this embodiment comprises the above-described configuration, it is possible to virtualize a plurality of external volumes 223 as a single virtual volume 123V, and to provide this virtual volume 123V to the mainframe 30.

Furthermore, in this embodiment, control information, which shows how the respective tracks of the virtual volume 123V will be used, is created and held inside the main storage apparatus 10. Therefore, in the case of an isometric write, in which the write-size from the mainframe 30 coincides with the data size set in the write destination inside the virtual volume 123V, processing can be carried out immediately, and the write performance of the main storage apparatus 10 can be improved.

In the case of an isometric write, it is possible to notify the mainframe 30 that write command processing has been completed at the point in time at which the write-data received from the mainframe 30 is stored in the cache memory 115 inside the main storage apparatus 10. Since the control information of the virtual volume 123V is automatically created in accordance with a format write request from the mainframe 30, under normal circumstances, a write command from the mainframe 30 is processed as an isometric write.

Therefore, creating and holding the virtual volume 123V control information inside the main storage apparatus 10 makes it possible to provide the virtual volume 123V to the mainframe 30 without lowering the write performance of the main storage apparatus 10.

Furthermore, in this embodiment, the virtual volume 123V control information is created in synch with the creation of the control information related to the external volume 223 at the time of an external volume 223 format write. Therefore, the control information of the virtual volume 123V and the control information of the respective external volumes 223 can be created at the same time, making it possible to complete format write processing quickly. Since a format write request from the mainframe 30 is transmitted to the external storage apparatus 20 by way of the main storage apparatus 10, it is efficient to simultaneously create the control information of the virtual volume 123V at that time.

By contrast, a method in which the control information of the respective external volumes 223 is created in advance, and thereafter, the main storage apparatus 10 collects the control information of the respective external volumes 223 from the external storage apparatus 20 and creates the control information related to the virtual volume 123V can also be considered. However, in this case, creating the virtual volume 123V control information will take time, lengthening the time required to complete format write processing. However, this method also falls within the scope of the present invention so long as it is not excluded from the scope of the claims.

Furthermore, the present invention is not limited to the embodiment described hereinabove. A person having ordinary skill in the art will be able to make various additions and changes without departing from the scope of the present invention.

What is claimed is:

1. A mainframe storage controller, which is connected to a mainframe and another storage controller,
wherein the other storage controller comprises a plurality of mainframe real volumes, and the mainframe storage controller comprises:

a virtual volume associated with the respective real volumes;

a converter for converting a command and data received from the mainframe to a command and data to be sent to the other storage controller, and converting data received from the other storage controller to data to be sent to the mainframe;

a control information creation unit for creating control information related to the format of the virtual volume, and managing this control information by associating same with the virtual volume; and a command processor, which uses the converter and the control information creation unit to process a command issued from the mainframe, and to notify the mainframe of the result of this processing, wherein the converter comprises:

a command converter, which is for converting a parameter in the command, and which, upon receiving the command for the virtual volume from the mainframe, converts a first cylinder number in this command to a second cylinder number of the corresponding real volume from among the respective real volumes; and a data converter, which is for respectively converting a count value of each record of the data received from either the mainframe or the other storage controller, and which, upon receiving the data from the mainframe, respectively converts the count value of each record in this data to the second cylinder number, and upon receiving the data from the other storage controller, respectively converts the count value of the each record in this data to the first cylinder number.

2. The mainframe storage controller according to claim 1, wherein the converter comprises:

a command converter for converting a parameter in the command, and a data converter for converting a count value in the data.

3. The mainframe storage controller according to claim 1, wherein the control information creation unit creates and stores the control information for each cylinder when the mainframe makes a format write request for the virtual volume.

4. The mainframe storage controller according to claim 1, wherein the other storage controller comprises another control information creation unit, which is for creating another control information related to the formats of the respective real volumes, and which stores the other control information created for each cylinder in accordance with the format write request in a control information area inside the real volume, and when the mainframe makes a format write request for the virtual volume, the converter converts the format write request to a format write request for the respective real volumes, and sends this request to the other storage controller, and the control information creation unit creates the control information related to the format of the virtual volume in synch with the creation of the other control information by the other control information creation unit.

5. The mainframe storage controller according to claim 1, wherein the control information is information for storing the data size of each record of each track constituting a cylinder.

6. The mainframe storage controller according to claim 1, further comprising:

a cylinder number correction table for correcting a cylinder number based on the corresponding relationship between the storage area of the virtual volume and the storage areas of the respective real volumes, and the command converter and the data converter use the cylinder number correction table to carry out the conversions of the first cylinder number and the second cylinder number.

7. The mainframe storage controller according to claim 1, wherein the storage areas of the respective real volumes, which can be used by the user, are associated with the virtual volume storage area in order from the start thereof.

8. A computer program for causing a computer to function as a virtualization device for combining a plurality of mainframe real volumes of another storage controller into a single virtual volume, and providing this virtual volume to a mainframe, the computer program causing the computer to realize:

a conversion function for converting a command and data received from the mainframe to a command and data to be sent to the other storage controller, and for converting data received from the other storage controller to data to be sent to the mainframe;

a control information creation function for creating control information related to the format of the virtual volume, and managing this control information by associating same with the virtual volume; and a command processing function for using the conversion function and the control information creation function to process the command issued from the mainframe, and for notifying the mainframe of the result of this processing, wherein the converter comprises:

a command converter, which is for converting a parameter in the command, and which, upon receiving the command for the virtual volume from the mainframe, converts a first cylinder number in this command to a second cylinder number of the corresponding real volume from among the respective real volumes; and a data converter, which is for respectively converting a count value of each record of the data received from either the mainframe or the other storage controller, and which, upon receiving the data from the mainframe, respectively converts the count value of each record in this data to the second cylinder number, and upon receiving the data from the other storage controller, respectively converts the count value of the each record in this data to the first cylinder number.

9. A host computer storage controller, which is connected to a host computer and another storage controller, wherein the other storage controller comprising a plurality of host computer real volumes, and the host computer storage controller comprising:

a virtual volume associated with the respective real volumes;

a converter for converting a command and data received from the host computer to a command and data to be sent to the other storage controller, and for converting data received from the other storage controller to data to be sent to the host computer;

a control information creation unit for creating control information related to the format of the virtual volume, and managing this control information by associating same with the virtual volume; and a command processor, which uses the converter and the control information creation unit to process a command issued from the host computer, and to notify the host computer of the result of this processing, wherein the converter comprises:

a command converter, which is for converting a parameter in the command, and which, upon receiving the command for the virtual volume from the mainframe, converts a first cylinder number in this command to a second cylinder number of the corresponding real volume from among the respective real volumes; and a data converter, which is for respectively converting a count value of each record of the data received from either the mainframe or the other storage controller, and which, upon receiving the data from the mainframe, respectively converts the count value of each record in this data to the second cylinder number, and upon receiving the data from the other storage controller, respectively converts the count value of the each record in this data to the first cylinder number.

* * * * *